US008646418B2

(12) United States Patent
Nakamura et al.

(10) Patent No.: US 8,646,418 B2
(45) Date of Patent: Feb. 11, 2014

(54) FOUR-STROKE ENGINE AND WORKING MACHINE USING THE SAME

(75) Inventors: Yuki Nakamura, Numazu (JP); Yasuyuki Sakakibara, Numazu (JP)

(73) Assignee: Makita Corporation, Anjo-shi (JP)

( * ) Notice: Subject to any disclaimer, the term of this patent is extended or adjusted under 35 U.S.C. 154(b) by 166 days.

(21) Appl. No.: 13/105,461

(22) Filed: May 11, 2011

(65) Prior Publication Data

US 2011/0308485 A1    Dec. 22, 2011

(30) Foreign Application Priority Data

Jun. 17, 2010 (JP) .................................. 2010-138260

(51) Int. Cl.
*F01P 7/04* (2006.01)
*F02B 75/32* (2006.01)

(52) U.S. Cl.
USPC .................................... 123/41.65; 123/197.4

(58) Field of Classification Search
USPC .......................................... 123/41.65, 197.4
See application file for complete search history.

(56) References Cited

U.S. PATENT DOCUMENTS

| | | | |
|---|---|---|---|
| 5,950,578 A | 9/1999 | Hirano et al. | |
| 5,992,375 A * | 11/1999 | Nagashima | 123/317 |
| 6,167,874 B1 * | 1/2001 | Becker et al. | 123/572 |
| 6,213,066 B1 * | 4/2001 | Dahlberg et al. | 123/73 A |
| 6,640,443 B2 | 11/2003 | Hüsges et al. | |
| 7,878,165 B2 | 2/2011 | Kono | |
| 2001/0035147 A1 | 11/2001 | Ito et al. | |
| 2002/0023613 A1 | 2/2002 | Ito et al. | |
| 2003/0051697 A1 | 3/2003 | Liu | |
| 2003/0079711 A1 * | 5/2003 | Ito et al. | 123/196 R |
| 2004/0206312 A1 * | 10/2004 | Liu et al. | 123/41.6 |

FOREIGN PATENT DOCUMENTS

| | | |
|---|---|---|
| JP | A-10-77835 | 3/1998 |
| JP | A-10-115221 | 5/1998 |
| JP | A-11-236819 | 8/1999 |
| JP | A-H11-324633 | 11/1999 |
| JP | A-2001-263023 | 9/2001 |
| JP | A-2001-355446 | 12/2001 |
| JP | A-2002-30933 | 1/2002 |
| JP | A-2002-038916 | 2/2002 |
| JP | A-2004-293448 | 10/2004 |
| JP | A-2007-2749 | 1/2007 |
| JP | A-2009-197770 | 9/2009 |

OTHER PUBLICATIONS

Extended Search Report issued in European Patent Application No. 11166369.6 dated Aug. 18, 2011.
Dec. 3, 2013 Office Action issued in Japanese Patent Application No. 2010-138260 with translation.

* cited by examiner

*Primary Examiner* — Lindsay Low
*Assistant Examiner* — Charles Brauch
(74) *Attorney, Agent, or Firm* — Oliff PLC

(57) ABSTRACT

A reduced size four-stroke engine and a working machine using the same are provided. A fuel tank is disposed in the space below a carburetor and an engine base is integrally formed with a fuel tank. By this means, the fuel tank is disposed in the space below the carburetor, and therefore the oil tank is not required to be disposed below the oil tank, so that it is possible to reduce the size.

20 Claims, 6 Drawing Sheets

FOUR-STROKE ENGINE AND WORKING MACHINE USING THE SAME

FIELD OF THE INVENTION

The present invention relates to a four-stroke engine that can be used in a portable working machine such as a brush cutter, a chain saw and a power blower, and a working machine using the same.

BACKGROUND OF THE INVENTION

Conventionally, a two-stroke engine has been used in a portable working machine. A two-stroke engine has a simpler structure than a four-stroke engine, and therefore can easily reduce its size and weight, and provide high output. However, a two-stroke engine consumes more fuel and discharges a larger amount of harmful substances than a four-stroke engine. Therefore, there is a demand to apply a four-stroke engine to a portable working machine taking into account influence on the environment (see, Patent Document 1).

PRIOR ART DOCUMENT

Patent Document

[Patent Document 1] Japanese Patent Application Laid-Open No. 2004-293448

SUMMARY OF THE INVENTION

The above-described four-stroke engine needs an intake valve and an exhaust valve, and an oil tank to lube each driving part. In the four-stroke engine, an intake valve and an exhaust valve are provided in a cylinder head side, and therefore a carburetor that creates mixture gas of fuel and air supplied to a cylinder, and an exhaust muffler to discharge the exhaust air from the cylinder are provided in the side in which the cylinder head is located. In addition, in the four-stroke engine, the oil tank is provided below a crank case. As a result of this, the four-stroke engine is larger in size than a two-stroke engine in the vertical direction, due to the intake valve, the exhaust valve and the oil tank, and therefore, should be reduced in size to be applied to a portable working machine.

It is therefore an object of the present invention to provide a reduced size four-stroke engine and a working machine using the same.

To solve the foregoing problems, a first aspect of the present invention provides a four-stroke engine. The four-stroke engine includes: an engine body having a cylinder block section in which a cylinder is provided, a cylinder head section provided above the cylinder block section and a crank case section provided below the cylinder block section; an intake valve and an exhaust valve open and close an intake port and an exhaust port provided on the cylinder head section in the engine body, respectively; an oil tank that is provided below the engine body and stores lubricating oil; a fuel tank that stores fuel; a carburetor connected to the intake port; and a muffler connected to the exhaust port. The fuel tank is provided below the carburetor.

In a second aspect of the present invention, the four-stroke engine includes an oil tank cover integrally formed with the fuel tank and disposed below the oil tank. In a third aspect of the present invention, the four-stroke engine includes a blower section that is coupled to the crank shaft and cools the engine body. An air flow passage that allows air sent by the blower section to flow through is provided between the oil tank cover and the outer surface of the oil tank. In a fourth aspect of the present invention, a plurality of protrusions parallel to each other and extending in the direction of air flow through the air flow passage are provided on the surface of the oil tank cover facing the oil tank. In a fifth aspect of the present invention, a plurality of protrusions parallel to each other and extending in the direction of air flow through the air flow passage are provided on the surface of the oil tank facing the oil tank cover.

In a sixth aspect of the present invention, legs are provided on the lower surface of the oil tank cover. In a seventh aspect of the present invention, a recoil starter is provided outside the blower section. The blower section is covered with a recoil starter cover covering the exterior of the recoil starter. In an eighth aspect of the present invention, the muffler and the carburetor are arranged to sandwich the cylinder head section. An oil feeding opening in the oil tank is provided below the exhaust muffler.

In a ninth aspect of the present invention, the four-stroke engine according to one of the first to eighth aspects is used in a working machine.

According to the first aspect of the present invention, it is possible to sufficiently increase the capacity of the fuel tank by providing the fuel tank below the carburetor connected to the intake port provided in the cylinder head section, so that the fuel tank does not need to be disposed below the oil tank, and therefore it is possible to reduce the outer dimension of the engine body in the vertical direction.

In addition, according to the second aspect of the present invention, the oil tank cover is integrally formed with the fuel tank, so that a mounting structure is not required to mount the oil tank cover on the outside of the oil tank. Therefore, it is possible to make the outer dimension and the number of components smaller than a case in which a mounting structure is provided. Moreover, according to the third aspect of the present invention, the air flowing through the air flow passage can cool the oil tank, and therefore, it is possible to prevent the lubricating ability of lubricating oil from deteriorating by heat. Moreover, according to the fourth aspect of the present invention, it is possible to rectify the air flowing through the air flow passage, and therefore increase the amount of air flow through the air flow passage and efficiently cool the four-stroke engine. Also, according to the fifth aspect of the present invention, it is possible to rectify the air flowing through the air flow passage, and consequently increase the amount of air flow through the air flow passage. Moreover, it is possible to increase the area of the lower surface of the oil tank contacting the air flowing through the air flow passage, and therefore improve the efficiency of cooling the oil tank.

In addition, according to the sixth aspect of the present invention, when the working machine using the four-stroke engine is placed on the ground, the legs contact the ground, so that it is possible to stably place the working machine on the ground even if the ground is not flat and rough. Moreover, according to the seventh aspect of the present invention, the exterior of the blower section is covered with the recoil starter cover, so that it is possible to share a fan casing to cover the blower section with the recoil starter. Therefore, it is possible to reduce the number of components and the weight. Moreover, according to the eighth aspect of the present invention, an oil feeding pipe to feed oil to the oil tank can be provided in the empty space below the muffler connected to an exhaust port provided in the cylinder head section, and therefore it is possible to reduce the size of the four-stroke engine.

Furthermore, according to the ninth aspect of the present invention, the four-stroke engine according to one of the first to eighth aspects, is applied to a working machine, so that it is possible to easily handle the working machine.

DETAILED DESCRIPTION OF THE PREFERRED EMBODIMENTS

Figure 1:
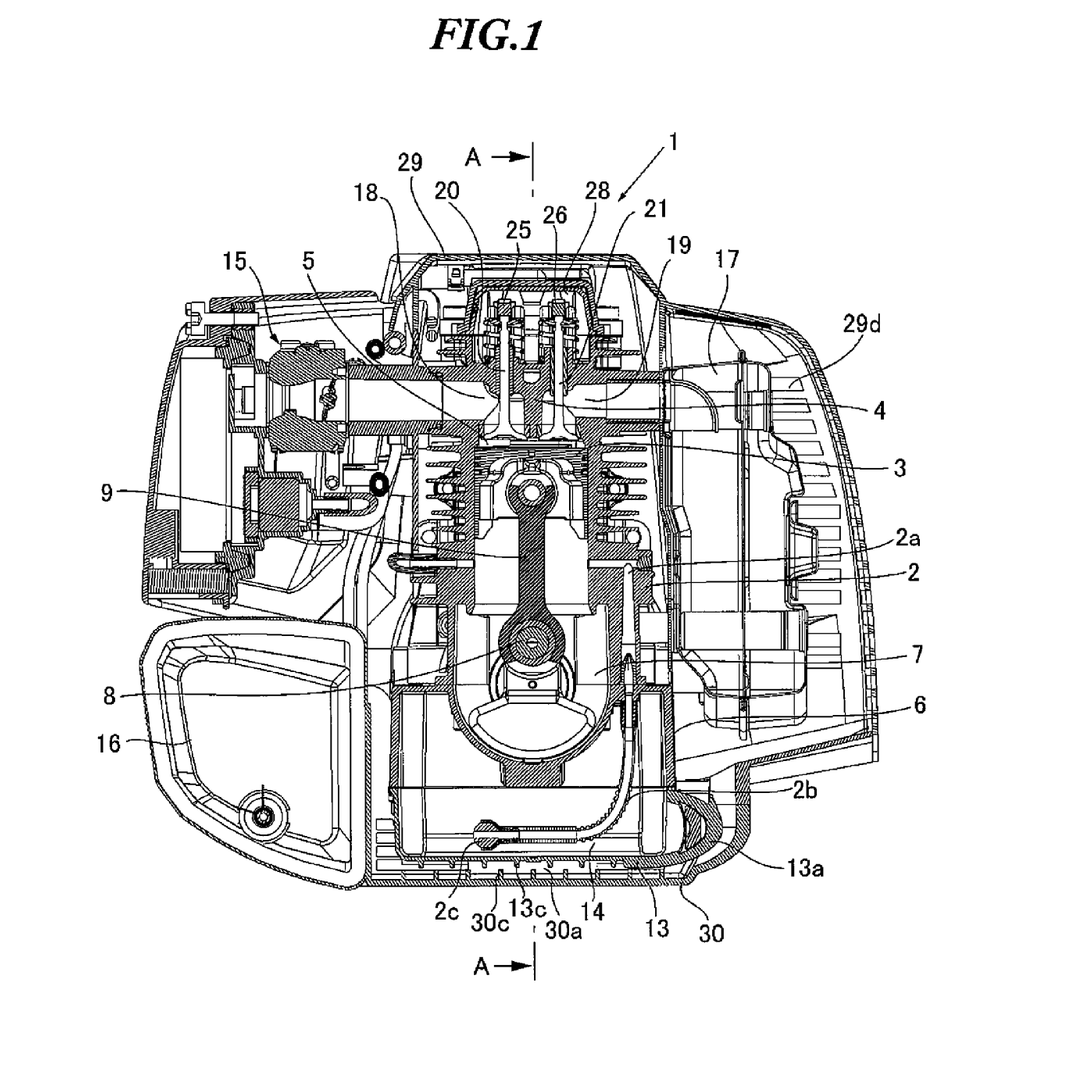
FIG. 1 is a cross sectional view showing the front surface of a four-stroke engine according to one embodiment of the present invention.
Figure 2:
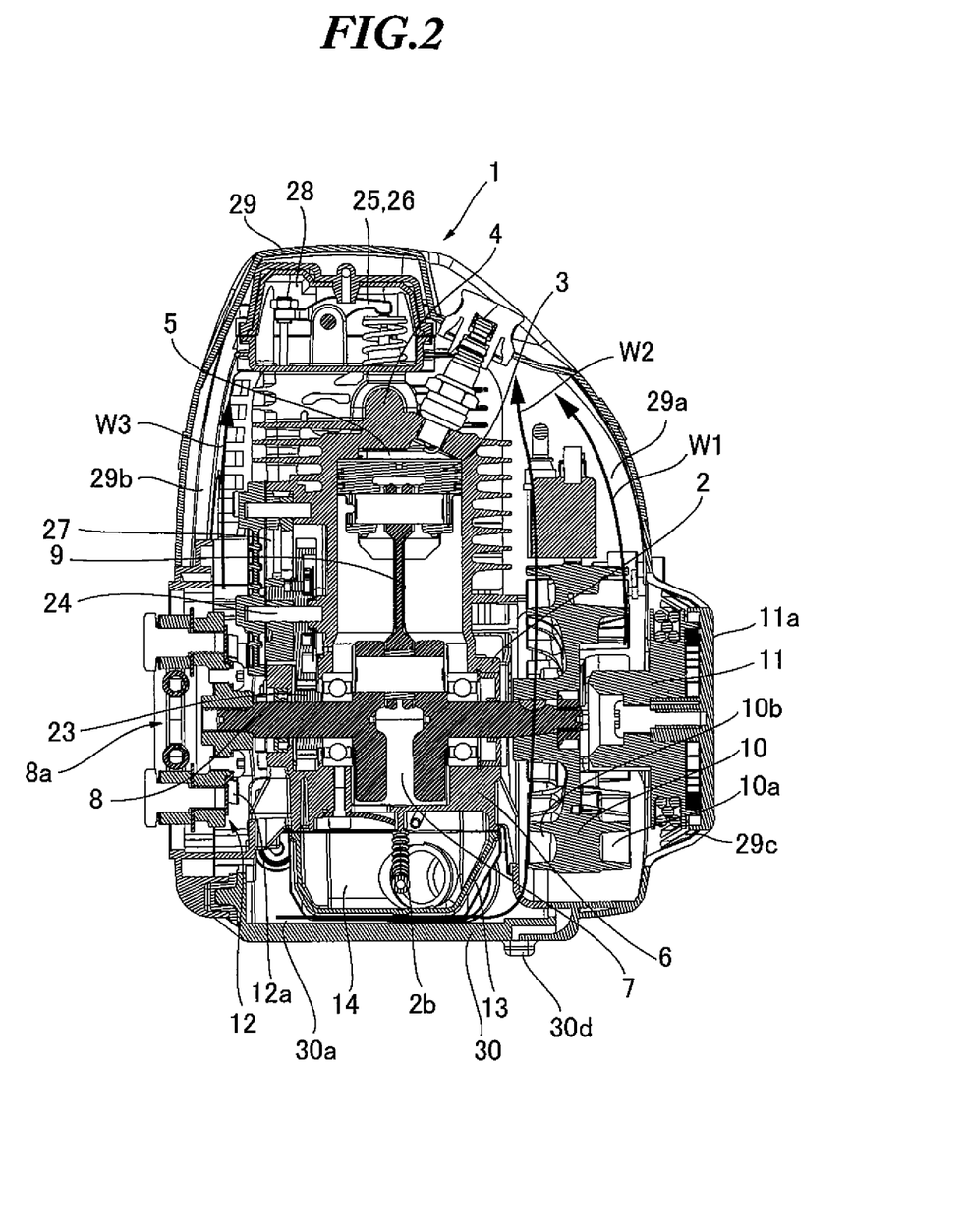
FIG. 2 is a cross sectional view along A-A line of FIG. 1.

FIG. 1 to FIG. 6 show one embodiment of the present invention. Here, with the present embodiment, the top, bottom, right side, left side, front side and back side in FIG. 1 will be described as "upper", "lower", "right", "left", "front" and "back" in the specification, respectively. The four-stroke engine 1 according to the present invention is used as the source of power of a working machine such as a brush cutter, chain saw and power blower. As shown in FIGS. 1 and 2, this four-stroke engine 1 accommodates a piston 3 in a cylinder block 2 such that the piston 3 can move upward and downward. A cylinder head 4 is integrally formed with the upper end part of this cylinder block 2. A combustion chamber 5 is formed by these cylinder block 2 and cylinder head 4, and the upper surface of the piston 3. A crank case 6 is fixed to the lower end part of the cylinder block 2. A crank chamber 7 is formed by the cylinder block 2 and the crank case 6.

A crank shaft 8 is rotatably supported in this crank chamber 7 such that both ends of the crank shaft 8 project from the crank chamber 7 forward and backward. This crank shaft 8 is coupled to the piston 3 via a connecting rod 9, and reciprocating motion. of the piston 3 is converted into rotational motion of the crank shaft 8 via the connecting rod 9.

A flywheel 10 is coupled to the forward end of the crank shaft 8 to stabilize rotation of the crank shaft 8. A plurality of fan blades 10a are provided on the front surface of the flywheel 10, which are apart from each other in the circumferential direction. In addition, a plurality of fan blades 10b are provided on the back surface of the flywheel 10, which are apart from each other in the circumferential direction. The plurality of fan blades 10a and 10b provided on the flywheel 10 distribute air in the radial direction of the flywheel 10 by rotation of the flywheel 10. In addition, a well-known recoil starter 11 to activate the four-stroke engine 1 is coupled to the forward end of the crank shaft 8 located in the forward part of the flywheel 10.

A shaft coupling part 8a that connects and supports the power transmission shaft of a working machine (not shown), is provided in the backward end of the crank shaft 8. Meanwhile, a small auxiliary impeller 12 that rotates with the crank shaft 8 to distribute air in the radial direction. of the crank shaft 8, is coupled to the front part of the shaft coupling part 8a in the crank shaft 8. A plurality of impeller blades 12a are provided on the front surface of the auxiliary impeller 12, which are apart from each other in the circumferential direction. Each of the plurality of impeller blades 12a is formed in the auxiliary impeller 12 by cutting and raising part of a circular metal plate.

An oil pan 13 is fixed to the lower surface of the crank case 6, and an oil tank 14 is formed by the crank case 6 and the oil pan 13. This oil tank 14 is space sealed with the crank case 6 and the oil pan 13 as shown in the figure, and stores lubricating oil to lube each driving component in the four-stroke engine 1 in the space. This prevents lubricating oil from scattering from the oil tank 14 even if a portable working machine such as a brush cutter overturns or turns sideways in use. In addition, the oil pan 13 is made of a metal material, and has an oil feeding pipe 13a extending obliquely upward from the right to feed lubricating oil to the tank 14. An opening formed in the end of the oil feeding pipe 13a is closed and opened by a lubricating oil cap 13b. In addition, on the lower surface of the oil pan 13, a plurality of protrusions 13c parallel to each other and extending lengthwise, are arranged apart from each other in the horizontal direction.

A carburetor 15 is provided on the left side of the part (cylinder head 4) above the cylinder block 2. The carburetor 15 mixes the fuel introduced from a fuel tank 16 with the air having passed through an air cleaner to create air-fuel mixture. The carburetor 15 is a diaphragm carburetor that can be used in all directions taking into account a case in which the working machine may overturn or turn sideways in use. Moreover, the carburetor 15 is connected with the fuel tank 16 through a suction pipe and a return pipe (not shown).

Figure 5:
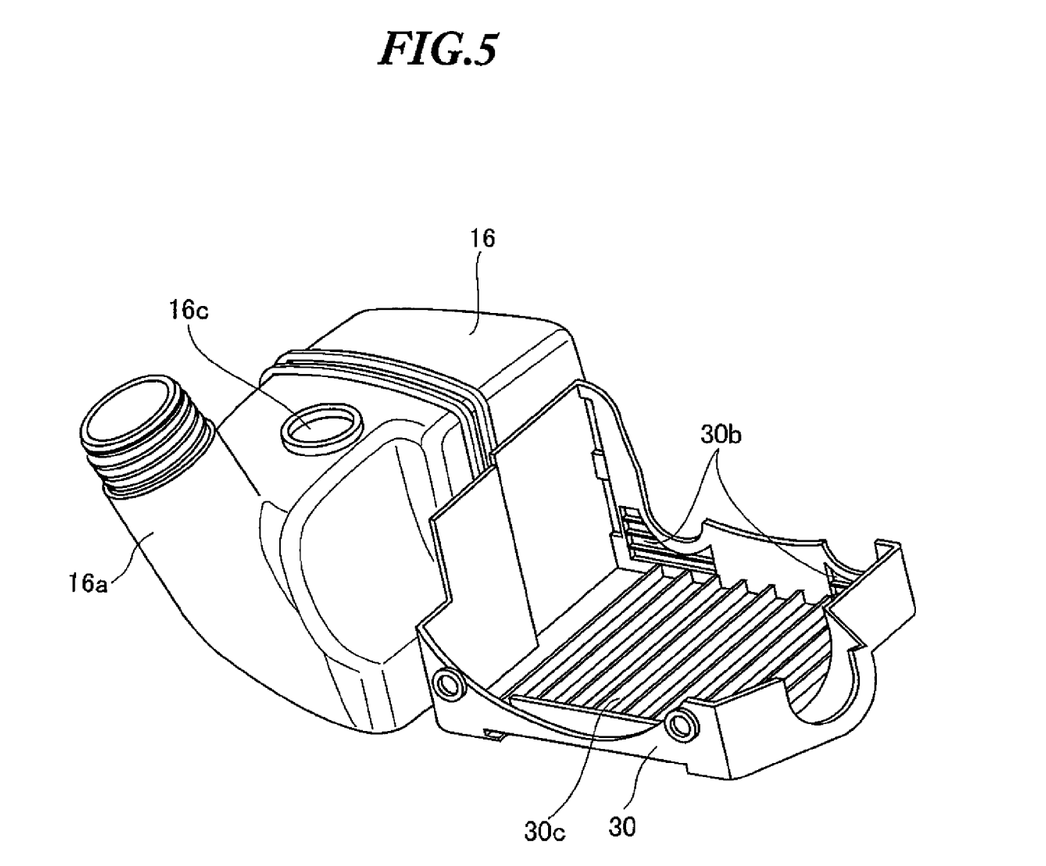
FIG. 5 is a perspective view showing a fuel tank and an oil tank cover.

The Fuel tank 16 is made of a synthetic resin material and provided in the space located on the left side of the crank chamber 7 and the oil tank 14 and below the carburetor 15. A fuel feeding pipe 16a extending obliquely upward is provided in the front part of the fuel tank 16. An opening formed in the end of the fuel feeding pipe 16a is closed and opened by a fuel cap 16b. In addition, as shown in FIG. 5, a cap mounting hole 16c is formed behind the fuel feeding pipe 16a to face the carburetor 15. A cap (not shown) is mounted on this cap mounting hole 16c while the suction pipe and the return pipe are pressed and fitted to penetrate the cap.

An exhaust muffler 17 to discharge gas created in the combustion chamber 5 is provided on the right side of the part (cylinder head 4) above the cylinder block 2. The Oil feeding pipe 13a to feed oil to the oil tank 14 is disposed below the exhaust muffler 17.

Figure 3:
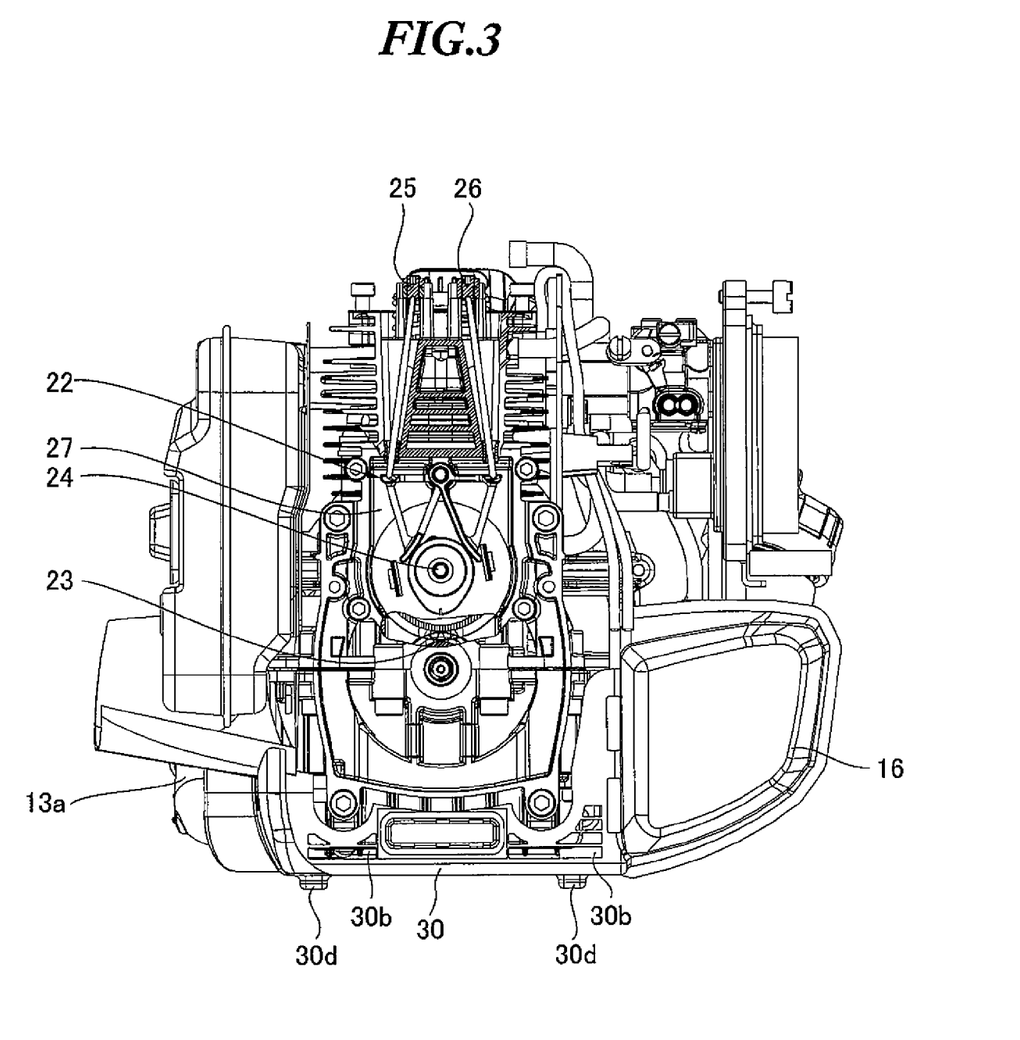
FIG. 3 is a partial cross sectional view showing the back surface of the four-stroke engine.
Figure 4:
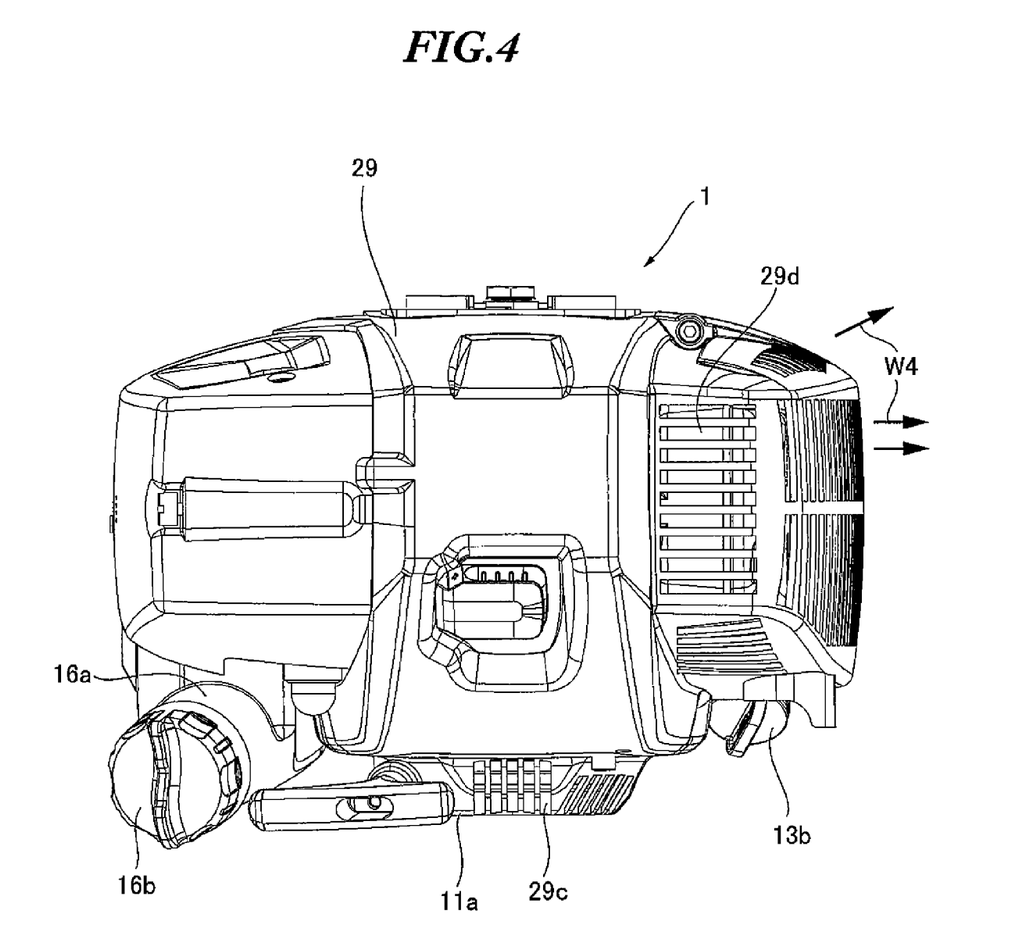
FIG. 4 is a plan view showing the four-stroke engine.

An intake port 18 to introduce air-fuel mixture created in the carburetor 15 into the combustion chamber 5 and an exhaust port 19 to introduce exhaust gas created in the combustion chamber 5 into the exhaust muffler 17, are formed in the cylinder head 4. In addition, an intake valve 20 to open and close the intake port 18 with respect to the combustion chamber 5 and an exhaust valve 21 to open and close the combustion chamber 5 with respect to the exhaust port 19, are provided in the cylinder head 4. These intake valve 20 and exhaust valve 21 open and close by means of a valve operating mechanism 22 for an overhead valve as shown in FIG. 3.

The valve operating mechanism 22 has a crank shaft gear 23, a cam shaft 24, and locker arms 25 and 26, as main components. The crank shaft gear 23 and the cam shaft 24 are provided in a side chamber 27 formed along the back surfaces of the cylinder block 2 and the crank case 6, and the locker arms 25 and 26 are provided in a valve operating chamber 28 formed above the cylinder head 4. The torque of the crank shaft 8 is transmitted to the intake valve 20 and the exhaust valve 21 through the crank shaft gear 23, the cam shaft 24 and the locker arms 25 and 26 to open and close the intake port 18 and the exhaust port 19.

In addition, the front surface, the upper surface and the back surface of this four-stroke engine 1 are covered with a casing 29, and the lower surface is covered with an engine base 30 as an oil tank cover.

On the inner surface of the casing 29, a front side air flow passage 29a is provided in the front side and a back side air flow passage 29b is provided in the back side. The front side air flow passage 29a is formed to extend in the vertical direction between the casing 29 and the front surfaces of the crank case 6, the cylinder block 2, the cylinder head 4, the valve operating chamber 28 and the exhaust muffler 17. The flywheel 10 is disposed in the lower part of the front side air flow passage 29a. The recoil starter 11 is provided in the front of the flywheel 10, and the exterior of the flywheel 10 is covered with a recoil starter cover 11a covering the exterior of the recoil starter 11. Meanwhile, the back side air flow passage 29b is formed to extend in the vertical direction between the casing 29 and the back surfaces of the cylinder block 2, except for the shaft coupling part 8a, the side chamber 27, the valve operating chamber 28 and the exhaust muffler 17. The auxiliary impeller 12 is disposed in the lower part of the back side air flow passage 29b.

A front side air inlet 29c is provided in the lower part of the front side air flow passage 29a, and the front side air flow passage 29a communicates with the front side air inlet 29c. In addition, an air outlet 29d to discharge the air flowing through the front side air flow passage 29a and the back side air flow passage 29b is provided in the upper right side (nearby the exhaust muffler 17) of the front surface air flow passage 29a and the back surface air flow passage 29b.

As shown in FIG. 5, the left side surface of the engine base 30 is coupled to the fuel tank 16, so that the engine base 30 is integrally formed with the fuel tank 16. In addition, the engine base 30 has a structure in which its front surface is clamped, with the casing 29, to the oil pan 13 with a screw, so that the engine base 30 is fixed. This allows the fuel tank 16 to be fixed to the oil pan 13. The engine base 30 is arranged apart from the lower surface of the oil pan 13, and a bottom side air flow passage 30a is formed between the engine base 30 and the lower surface of the oil pan 13. The front surface of the bottom side air flow passage 30a communicates with the lower end of the front side air flow passage 29a, and the back surface of the bottom side air flow passage 30a communicates with the lower end of the back side air flow passage 29b. In addition, back side air inlets 30b are provided on the back surface of the engine base 30, and the back side air flow passage 29b, the bottom side air flow passage 30a and the front side air flow passage 29a communicate with the back side air inlets 30b. The bottom side air flow passage 30a is closed at the right edge. On the upper surface of the engine base 30, a plurality of protrusions 30c parallel to each other and extending lengthwise, are arranged apart from each other in the horizontal direction. In addition, a pair of left and right legs 30d projecting downward, is provided in the front portion of the lower surface of engine base 30.

Here, circulation of lubricating oil stored in the oil tank 14 will be described. A communicating path 2a is formed between the oil tank 14 and the crank chamber 7. A flexible pipe 2b is connected to the opening in the communicating path 2a in the oil tank 14 side. The oil tank 14 communicates with the crank chamber 7 through communicating path 2a according to the movement of the piston 3. Lubricating oil in the oil tank 14 is introduced into the crank chamber 7, the side chamber 27 and the valve operating chamber 28 by means of a change in the pressure in the crank chamber 7, and returns to the oil tank 14 after lubing each driving component. A weight 2c is provided on the tip of the pipe 2b to allow the pipe 2b to follow a change in the liquid level of lubricating oil. By this means, even if the four-stroke engine 1 is tilted, the pipe 2b can reliably inhale the lubricating oil in the oil tank 14.

Upon driving the above-described engine for a working machine, the flywheel 10 rotates with the crank shaft 8, and air flows from the front side air inlet 29c into the front side air flow passage 29a due to the action of the fan blades 10a provided on the front surface of the flywheel 10. As indicated by an arrow Ni in FIG. 2, the air flowing into the front side air flow passage 29a cools the cylinder head 4 and the operating valve chamber 28.

Meanwhile, air flows from the back side air inlets 30b into the bottom side air flow passage 30a due to the action of the fan blades 10b provided on the back surface of the flywheel 10. The air flowing into the bottom side air flow passage 30a cools the inside of the oil tank 14, the crank case 6 and the lower part of the cylinder block 2 while flowing through the bottom side air flow passage 30a as indicted by an arrow in FIG. 2, and then flows into the front side air flow passage 29a.

The air flowing through the bottom side air flow passage 30a is rectified by each protrusion 13c provided on the lower surface of the oil pan 13 and each protrusion 30c provided on the upper surface of the engine base 30. The heat transfer area of the oil pan 13 is enlarged by each protrusion 13c, so that heat exchange between the air flowing through the bottom side air flow passage 30a and the lubricating oil in the oil tank 14 is accelerated.

Meanwhile, air flows from the back side air inlets 30b into the back side air flow passage 29b due to the action of the auxiliary impeller 12 rotating with the crank shaft 8. As indicated by an arrow W3 in FIG. 2, the air flowing into the back side air flow passage 29b cools the side chamber 27 and the valve operating chamber 28.

Incidentally, the inner surface of the casing 29 in the front side is formed to have a curved shape curving upward and backward. Therefore, the air flowing through the front side air flow passage 29a is guided backward as flowing upward along the inner surface of the casing 29.

Meanwhile, the inner surface of the casing 29 in the back side is formed to have a curved shape curving upward and forward. Therefore, the air flowing through the back side air flow passage 29b is guided forward as flowing upward along the inner surface of casing 29.

The air flowing through the front side air flow passage 29a and the air flowing through the back side air flow passage 29b join together and are mixed nearby the air outlet 29d in the casing 29, and discharged from the air outlet 29d to the outside of the casing 29. At this time, the air is discharged from the air outlet 29d to the right as indicated by an arrow W4 in FIG. 4, because the air flowing through the front side air flow passage 29a and the air flowing through the back side air flow passage 29b join together as described above.

The air flowing through the front side air flow passage 29a cools the oil tank 14, the crank case 6, the cylinder block 2, the cylinder head 4 and the valve operating chamber 28, and therefore increases in the temperature. Meanwhile, the temperature of the air flowing through the back side air flow passage 29b is lower than that of the air flowing through the front side air flow passage 29a, because the back side air flow passage 29b has the shorter entire length than the front side air flow passage 29a and cools members in the side chamber 27 and the valve operating chamber 28 whose temperature is lower than the cylinder block 2. Therefore, the air at a high temperature having flowed through the front side air flow passage 29a is mixed with the air at a relatively low temperature flowing through the back side air flow passage 29b, and therefore it is possible to prevent air at a high temperature from being directly discharged from the air outlet 29d.

Figure 6:
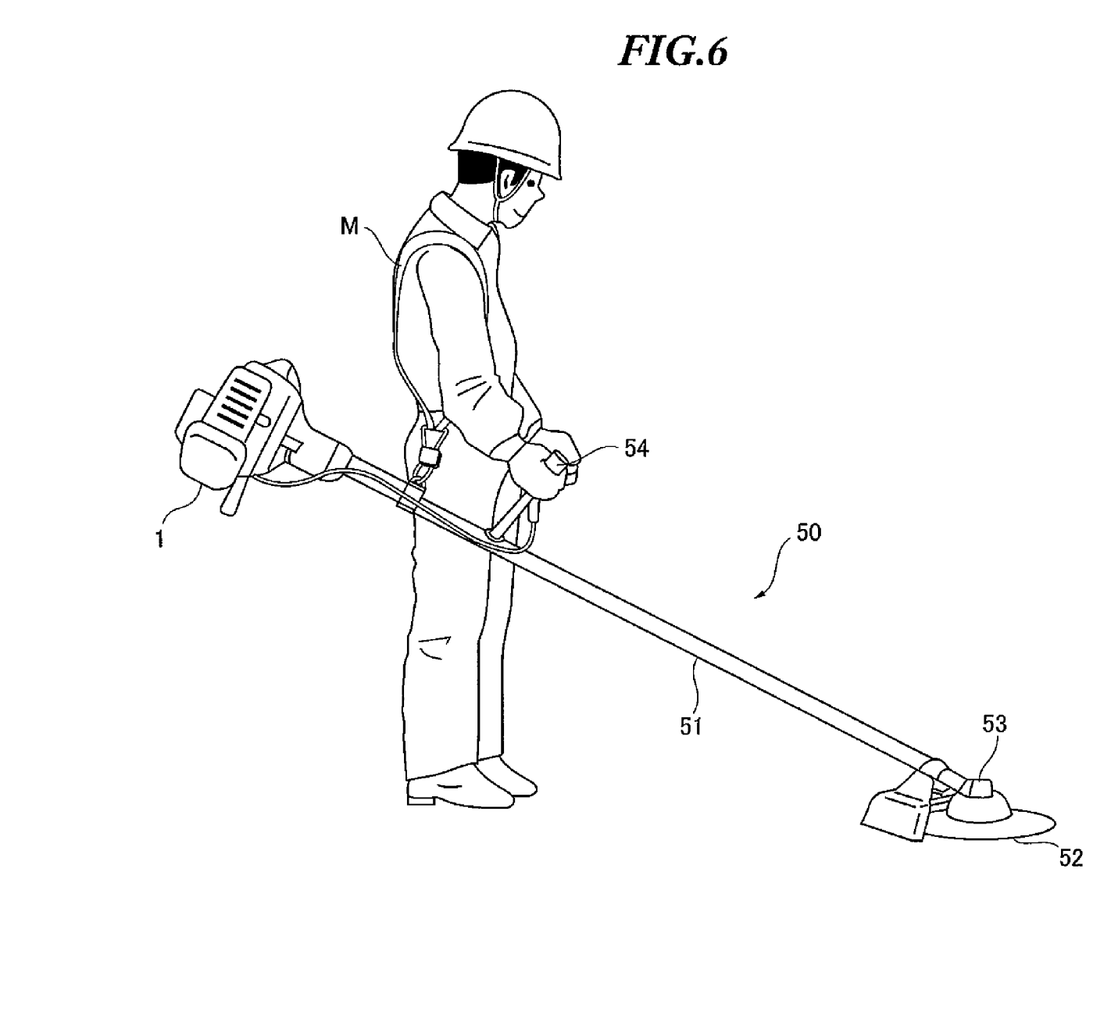
FIG. 6 shows a state where a brush cutter to which the four-stroke engine is applied, is used.

Next, a case will be explained where the four-stroke engine 1 is provided in a brush cutter 50 as an example of working machines.

This brush cutter 50 has the four-stroke engine 1, an operating rod 51 whose one end is connected to the back surface of the four-stroke engine 1 and a circular saw 52 rotatably mounted to the other end of the operating rod 51.

A power transmission shaft (not shown) is rotatably mounted in the operating rod 51. The shaft coupling part 8a in the four-stroke engine 1 is coupled to one end of the power transmission shaft and the circular saw 52 is coupled to the other end via a gear head 53. A handle 54 is provided near the intermediate part of the operating rod 51. A control lever (not shown) to control operation of the four-stroke engine 1 is provided in the handle 54.

To do work using the brush cutter 50 configured as described above, first the four-stroke engine 1 is driven and the control lever is operated, and therefore the torque of the four-stroke engine 1 is transmitted to the circular saw 52 via the power transmission shaft to rotate the circular saw 52. Then, an operator M holds the handle 54 by hand and moves the circular saw 52 to cut and other plants.

At this time, the four-stroke engine 1 is located behind the operator M a little to the right and its back surface faces the operator M. Here, the air in the four-stroke engine 1 is discharged from the air outlet 29d toward the right hand of the four-stroke engine 1, and therefore does not directly touch the operator M. In addition, the air at a high temperature having flowed through the front side air flow passage 29a is mixed with the air at a low temperature flowing through the back side air flow passage 29b. This prevents the temperature of the air to be discharged from the air outlet 29d from being high, and therefore it is possible to improve safety.

In this way, in the four-stroke engine 1 according to the present embodiment, the fuel tank 16 is disposed in the space below the carburetor 15. By this means, it is not necessary to dispose the fuel tank 16 below the oil tank 14, and therefore it is possible to reduce the size of the four-stroke engine 1 in the vertical direction.

In addition, the four-stroke engine 1 has the engine base 30 integrally formed with the fuel tank 16 and disposed below the oil tank 14. By this means, a mounting structure to mount the engine base 30 under the oil tank 14 is not required, and therefore it is possible to reduce the size of the four-stroke engine 1 in the vertical direction and also reduce the number of components, as compared to a case in which the mounting structure is provided.

Moreover, the bottom side air flow passage 30a is provided between the oil tank 14 and the engine base 30. By this means, the lubricating oil in the oil tank 14 can be cooled by the air flowing through the bottom side air flow passage 30a, and therefore it is possible to prevent the lubricating ability of lubricating oil from deteriorating by heat.

Moreover, a plurality of protrusions 30c parallel to each other and extending along the bottom side air flow passage 30a are provided on the upper surface (the surface facing the oil tank 14) of the engine base 30. By this means, the air flowing through the bottom side air flow passage 30a can be rectified, and therefore the amount of air flowing through the bottom side air flow passage 30a can be increased, so that it is possible to efficiently cool the four-stroke engine 1.

In addition, a plurality of protrusions 13a parallel to each other and extending along the bottom side air flow passage 30a are provided on the lower surface (the surface facing the engine base 30) of the oil pan 13. By this means, the air flowing through the bottom side air flow passage 30a can be rectified, and therefore the amount of air flowing through the bottom side air flow passage 30a can be increased. Moreover, the area of the lower surface of the oil pan 13 contacting the air flowing through the bottom side air flow passage 30a can be increased, and therefore it is possible to improve the efficiency of cooling the lubricating oil in the oil tank 14.

Moreover, the legs 30d are provided on the lower surface of the engine base 30. By this means, when a working machine using the four-stroke engine 1 is placed on the ground, the legs 30 contact the ground, and therefore the working machine can be stably placed even if the ground is not flat and rough, Moreover, the recoil starter 11 is provided outside the flywheel 10, and the flywheel 10 is covered with the recoil starter cover 11a covering the exterior of the recoil starter 11. By this means, the recoil starter cover 11a can also be used as the casing to cover the flywheel 10, and therefore it is possible to reduce the number of components and the weight.

Moreover, the oil feeding pipe 13a to feed oil to the oil tank 14 is disposed on the right side of the oil tank 14 below the exhaust muffler 17. By this means, the oil feeding pipe 13a can be disposed in unused space, so that it is possible to reduce the size of the four-stroke engine 1.

Furthermore, the four-stroke engine 1 is used in the brush cutter 50, so that the brush cutter 50 can be easily handled.

Here, although with the embodiment, the brush cutter 50 has been shown as a working machine to which the four-stroke engine 1 is applied, the present invention is not limited to this. For example, working machines include all machines such as a chain saw and a power blower, which are connected to the crank shaft 8 and operate by the torque of the crank shaft 8.

Moreover, although with the embodiment, the vertical four-stroke engine 1 has been shown in which the cylinder head 4 is located above the cylinder block 2 and the clunk case 6 is located below the cylinder block 2, the present invention is not limited to this. For example, a horizontal four-stroke engine is possible in which the cylinder head 4 is located in one side of the cylinder block 2 and the crank case 6 is located in the other side of the cylinder block 2 in the horizontal direction.

Moreover, although with the embodiment, a configuration has been adopted in which the flywheel 10 having fan blades 10a and 10b on both sides, as blower means, is coupled to the crank shaft 8, the present invention is not limited to this. Another configuration is possible where, for example, a dedicated impeller having the blades on both sides is coupled with the crank shaft 8 as long as it is possible to flow air by rotation of the crank shaft 8.

Furthermore, although with the embodiment, a configuration has been adopted in which the fuel tank 16 is integrally formed with the engine base 30 using synthetic resin, the present invention is not limited to this. The fuel tank 16 may be integrally formed with the engine base 30 by, for example, fixing the engine base 30 to the fuel tank 16 by means of adhesion, screw clamp and so forth. In addition, the fuel tank 16 and the engine base 30 may be made of different materials, such as metal and synthetic resin, respectively.

Moreover, with the present embodiment, a configuration has been adopted in which a pair of left and right legs 30d is provided on the front side of the lower surface of the engine base 30, taking into account that the power transmission shaft in the brush cutter 50 is coupled to the back side of the lower surface of the engine base 30, but the present invention is not limited to this. The legs 30d are not limited to a pair of left and right legs on the front side of the lower surface of the engine base 30, and, for example, the four-stroke engine 1 may be placed on the ground by providing the legs 30*d* on the four corners in the lower surface of the engine base 30.

Moreover, the shape, arrangement and so forth of each component of the combustion system and the driving system, such as the carburetor 15, the piston 3 and the crank shaft 8, are merely examples, and the present invention is not limited to the configuration of the embodiment.

What is claimed is:

1. A four-stroke engine comprising:
    an engine body having a cylinder block section in which a cylinder is provided, a cylinder head section provided above the cylinder block section and a crank case section provided below the cylinder block section;
    an intake valve and an exhaust valve open and close an intake port and an exhaust port provided on the cylinder head section in the engine body, respectively;
    a crank shaft rotatably supported by the crank case section;
    an oil tank that is provided directly beneath the engine body and stores lubricating oil;
    a fuel tank that stores fuel;
    a carburetor connected to the intake port; and
    a muffler connected to the exhaust port,
    wherein the carburetor is provided on a side of the cylinder head section of the engine body; and
    the fuel tank is disposed in a space directly beneath the carburetor, on a side of the crank case section of the engine body and the oil tank.

2. The four-stroke engine according to claim 1, further comprising an oil tank cover that is integrally foal ed with the fuel tank and disposed below the oil tank.

3. The four-stroke engine according to claim 2, further comprising a blower section that is coupled to the crank shaft and cools the engine body, wherein an air flow passage that allows air sent by the blower section to flow through is provided between the oil tank cover and an outer surface of the oil tank.

4. The four-stroke engine according to claim 3, wherein a plurality of protrusions parallel to each other and extending in a direction of air flow through the air flow passage, are provided on a surface of the oil tank cover facing the oil tank.

5. The four-stroke engine according to claim 3, wherein a plurality of protrusions parallel to each other and extending in a direction of air flow through the air flow passage are provided on a surface of the oil tank facing the oil tank cover.

6. The four-stroke engine according to claim 4, wherein a plurality of protrusions parallel to each other and extending in a direction of air flow through the air flow passage are provided on a surface of the oil tank facing the oil tank cover.

7. The four-stroke engine according to claim 2, wherein legs are provided on a lower surface of the oil tank cover.

8. The four-stroke engine according to claim 3, wherein legs are provided on a lower surface of the oil tank cover.

9. The four-stroke engine according to claim 4, wherein legs are provided on a lower surface of the oil tank cover.

10. The four-stroke engine according to claim 3, further comprising a recoil starter outside the blower section, wherein the blower section is covered with a recoil starter cover covering an exterior of the recoil starter.

11. The four-stroke engine according to claim 4, further comprising a recoil starter outside the blower section, wherein the blower section is covered with a recoil starter cover covering an exterior of the recoil starter.

12. The four-stroke engine according to claim 1, wherein:
    the exhaust muffler and the carburetor are arranged to sandwich the cylinder head section; and
    an oil feeding opening in the oil tank is provided below the exhaust muffler.

13. The four-stroke engine according to claim 2, wherein:
    the exhaust muffler and the carburetor are arranged to sandwich the cylinder head section; and
    an oil feeding opening in the oil tank is provided below the exhaust muffler.

14. The four-stroke engine according to claim 3, wherein:
    the exhaust muffler and the carburetor are arranged to sandwich the cylinder head section; and
    an oil feeding opening in the oil tank is provided below the exhaust muffler.

15. A working machine that uses a four-stroke engine according to claim 1.

16. A working machine that uses a four-stroke engine according to claim 2.

17. A working machine that uses a four-stroke engine according to claim 3.

18. A working machine that uses a four-stroke engine according to claim 4.

19. A working machine that uses a four-stroke engine according to claim 7.

20. A working machine that uses a four-stroke engine according to claim 12.

* * * * *